(12) United States Patent
Walton

(10) Patent No.: US 6,832,765 B1
(45) Date of Patent: Dec. 21, 2004

(54) STEERABLE IN-LINE SKATES

(76) Inventor: Robert Christopher Walton, 6 East Avenue, Oxford OX4 1XW (GB)

( * ) Notice: Subject to any disclaimer, the term of this patent is extended or adjusted under 35 U.S.C. 154(b) by 0 days.

(21) Appl. No.: 09/721,052

(22) Filed: Nov. 22, 2000

Related U.S. Application Data

(63) Continuation-in-part of application No. 09/450,461, filed on Nov. 29, 1999, now abandoned.

(30) Foreign Application Priority Data

Dec. 2, 1998 (GB) .............................................. 9826342
Mar. 12, 1999 (GB) .............................................. 9905577

(51) Int. Cl.[7] .............................................. A63C 17/00
(52) U.S. Cl. .............................. 280/11.221; 280/11.19; 280/11.223; 280/87.041
(58) Field of Search ...................... 280/11.221, 87.041, 280/87.042, 11.233, 11.25, 11.19, 11.223

(56) References Cited

U.S. PATENT DOCUMENTS

| 1,034,649 | A | | 8/1912 | Rice | |
|---|---|---|---|---|---|
| 1,314,159 | A | | 8/1919 | Steiger | |
| 3,389,922 | A | * | 6/1968 | Eastin | 280/842 |
| 3,484,116 | A | | 12/1969 | Allen | |
| 3,876,217 | A | * | 4/1975 | Copier | 280/11.225 |
| 4,991,861 | A | * | 2/1991 | Carn et al. | 280/87.042 |
| 5,160,155 | A | * | 11/1992 | Barachet | 280/87.042 |
| 5,551,717 | A | * | 9/1996 | De Courcey Milne | 280/87.042 |
| 5,860,657 | A | * | 1/1999 | Kroher | 280/11.223 |
| 5,927,735 | A | * | 7/1999 | Hosoda | 280/87.042 |
| 5,975,229 | A | * | 11/1999 | Hosoda | 180/181 |
| 6,241,264 | B1 | * | 6/2001 | Page | 280/11.19 |
| 6,398,237 | B1 | * | 6/2002 | Attey | 280/87.042 |
| 6,398,238 | B1 | * | 6/2002 | Shaw | 280/87.042 |
| 6,592,129 | B1 | * | 7/2003 | Gates | 280/11.204 |
| 6,669,215 | B2 | * | 12/2003 | Laporte | 280/87.042 |
| 6,676,138 | B1 | * | 1/2004 | Rosso | 280/11.221 |
| 2003/0011151 | A1 | * | 1/2003 | Lai et al. | 280/11.223 |
| 2003/0116930 | A1 | * | 6/2003 | Gorisch | 280/11.27 |
| 2003/0122334 | A1 | * | 7/2003 | Laporte | 280/87.041 |
| 2003/0122335 | A1 | * | 7/2003 | Beck | 280/87.041 |
| 2003/0164269 | A1 | * | 9/2003 | Attey | 188/19 |

FOREIGN PATENT DOCUMENTS

| DE | 004311687 | 10/1994 | |
|---|---|---|---|
| EP | 0064360 | 11/1982 | |
| EP | 608576 | 8/1994 | |
| FR | 2607713 A1 | * 10/1988 | ........... A63C/17/06 |
| GB | 1105966 | 3/1968 | |

* cited by examiner

Primary Examiner—Christopher P. Ellis
Assistant Examiner—J. Allen Shriver
(74) Attorney, Agent, or Firm—Davis & Bujold, P.L.L.C.

(57) ABSTRACT

A wheeled skate apparatus with a steerable front wheel connected by a steering linkage having two lever arm linkages which produce an instantaneous steering axis inclined with respect to the vertical to produce a caster effect and provide an angulation of the steerable front wheel with respect to the forward direction of travel to provide a change in the direction of travel of the skate apparatus.

17 Claims, 6 Drawing Sheets

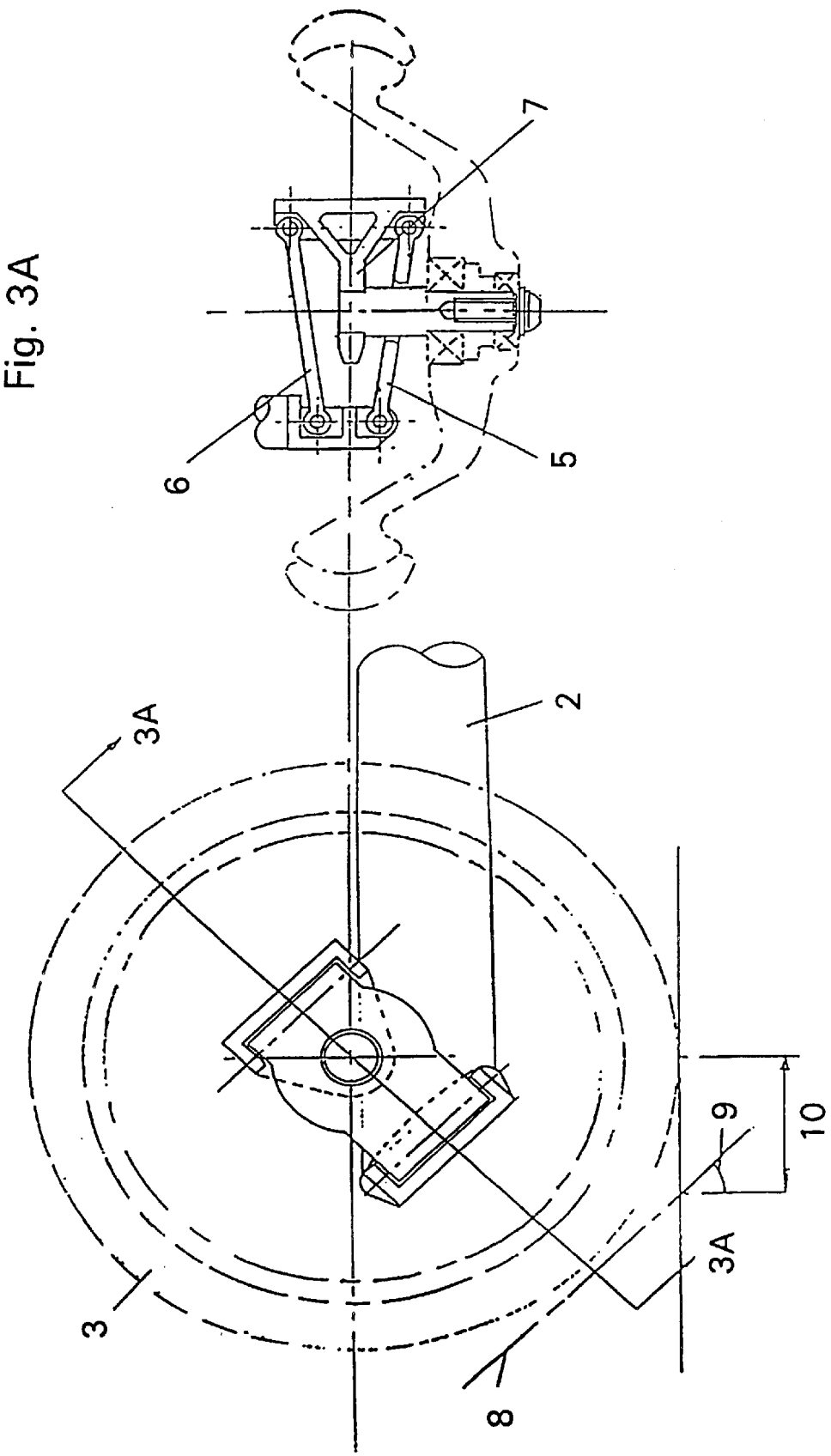

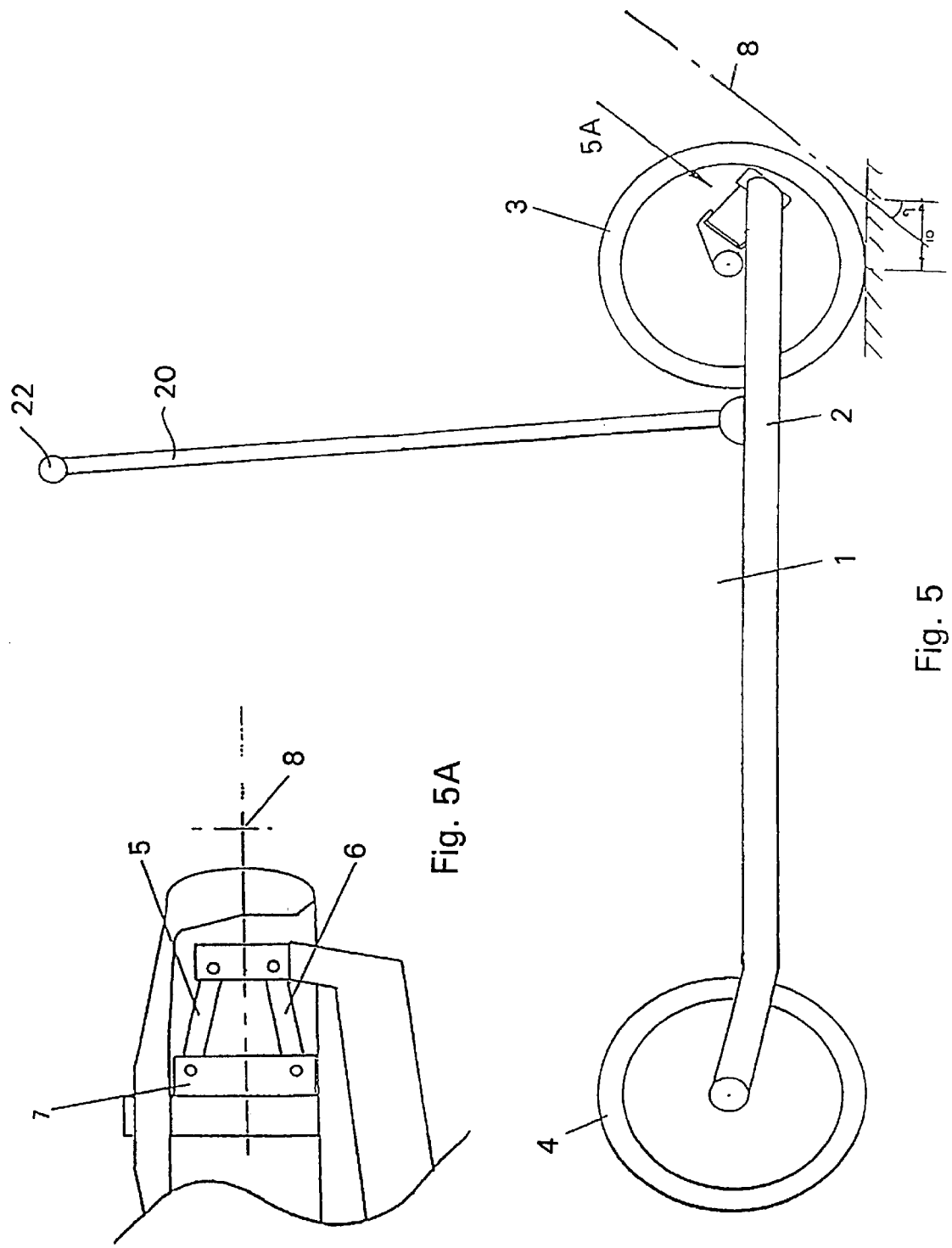

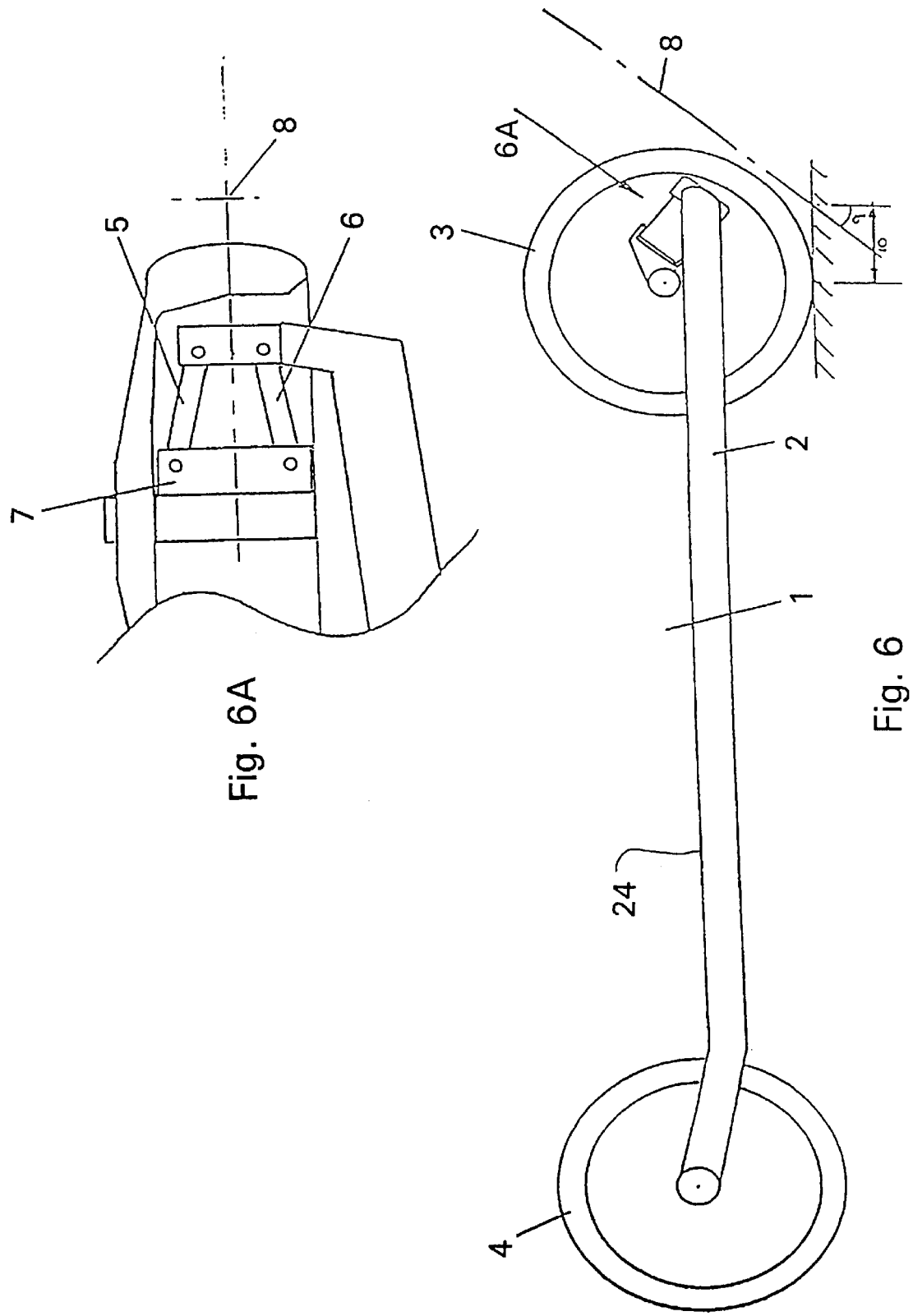

Figure 1:
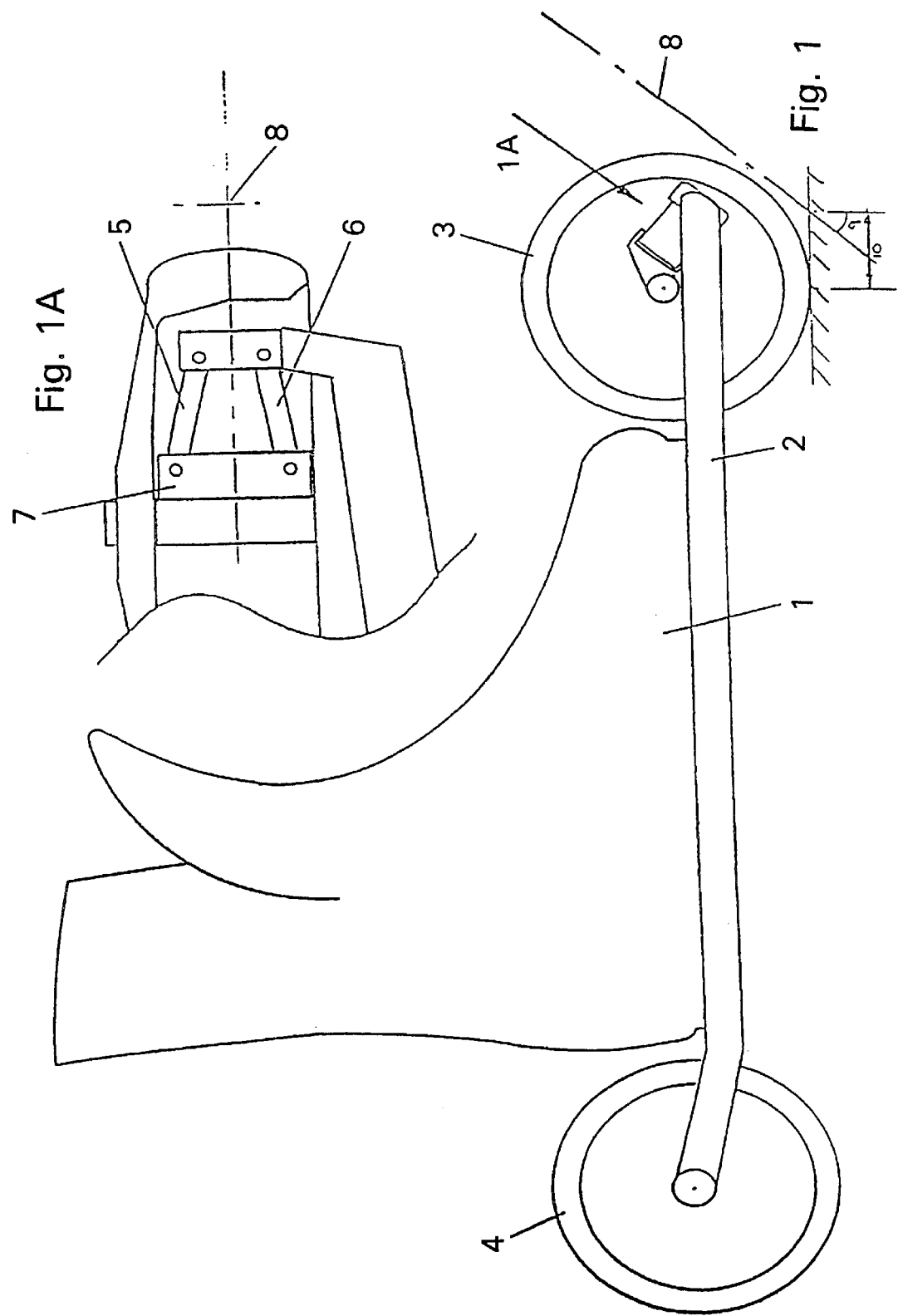
Figure 2:
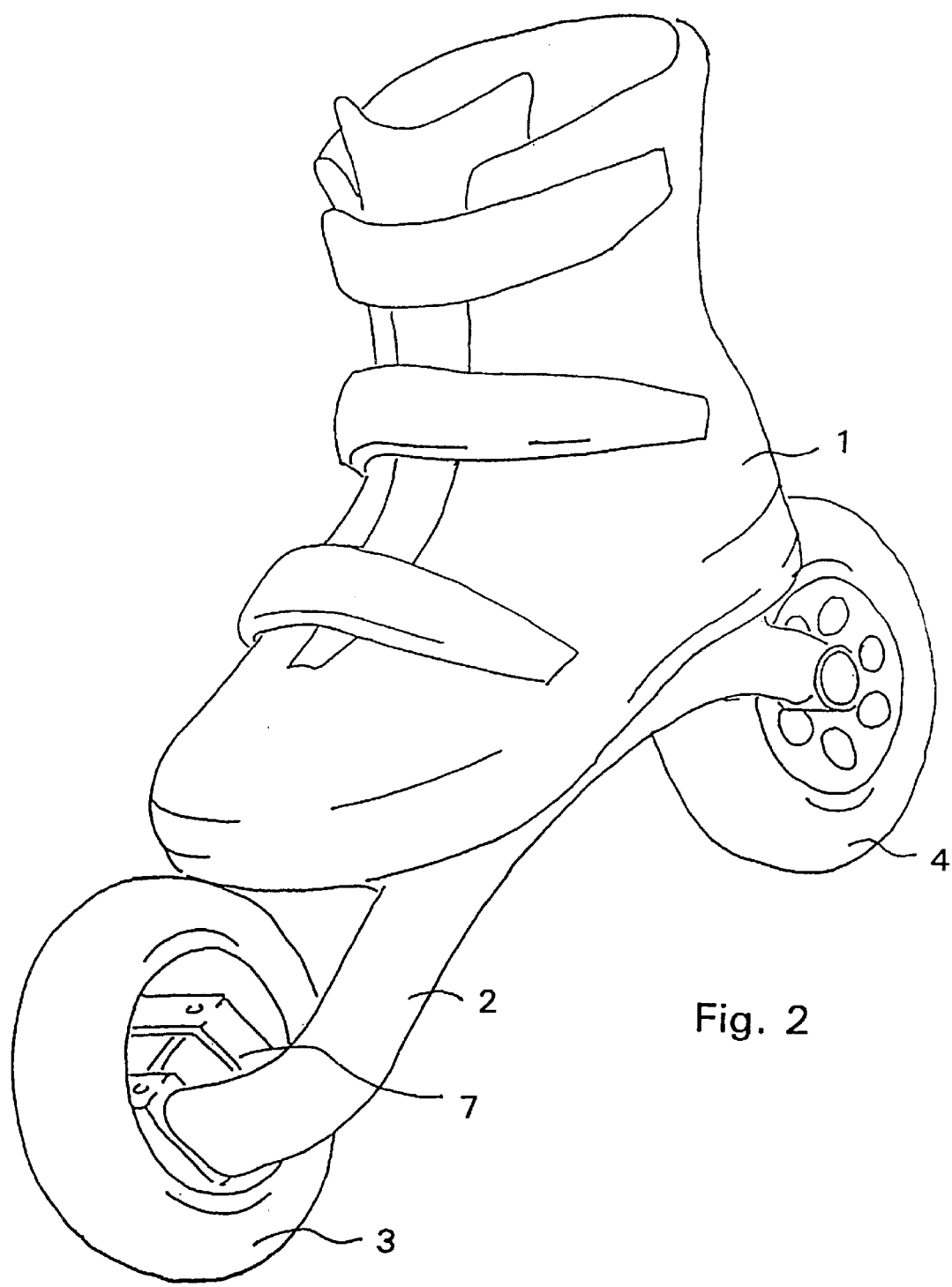
Figure 4B:
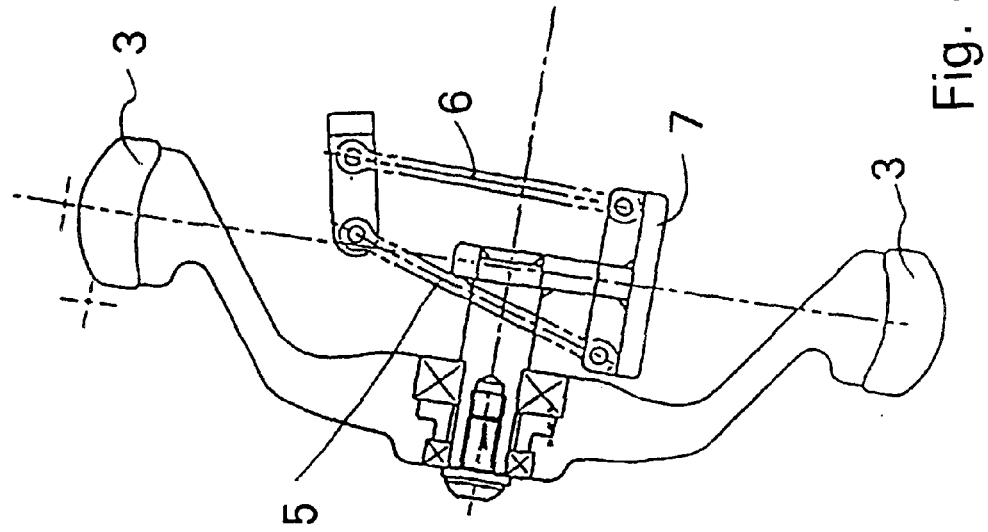
Figure 4A:
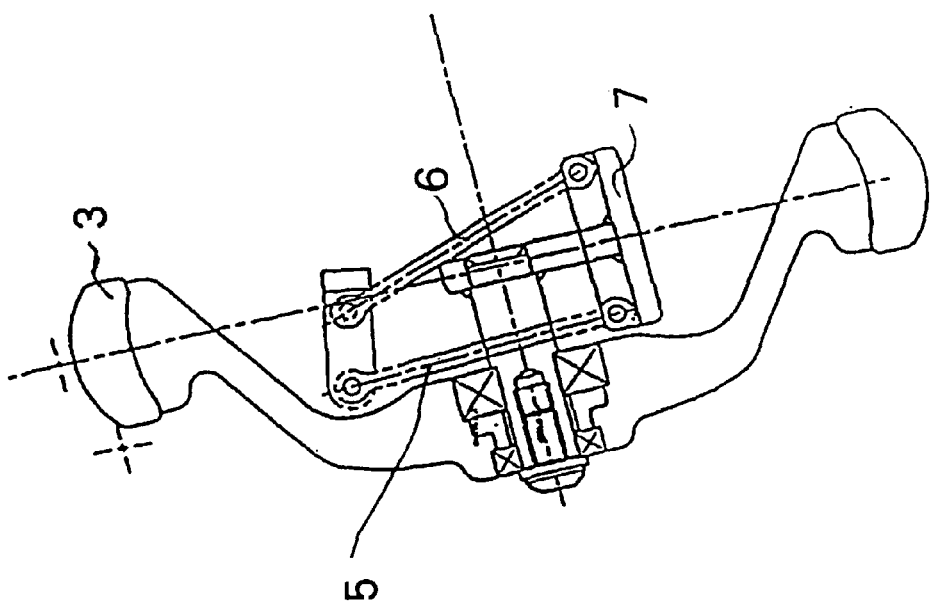

STEERABLE IN-LINE SKATES

This application is a continuation-in-part of Ser. No. 09/450,461 filed Nov. 29, 1999.

FIELD OF THE INVENTION

This invention relates to steerable skate apparatus, in particular, a wheel suspension for skate apparatus specifically, in-line skates, skateboards and scooters and other personal wheeled transportation devices.

BACKGROUND OF THE INVENTION

Conventional four wheel roller skates, with a wheel at "each corner", are able to steer by leaning the foot to either side. The axles are usually mounted on pivots, which are inclined to the horizontal and incorporate a compliant elastomer block to self-center the steering. Balancing while wearing the skates is fairly natural. Leaning to the right produces a turn to the right and vice versa, which tends to correct the skater's balance.

With the advent of in-line skates, skate devices including scooters and skate boards in which the wheels are substantially linearly aligned have been developed. In such devices the wheels are rotatablely affixed to the device and an axle or spindle about which the wheel rotates is positionally fixed relative to a frame of the skate device. Steering is accomplished by rotating the linearly aligned wheels at an angle about a vertical axis. That is, the skater points his foot, and therefore the linear alignment of the wheels, in a desired direction. This is an unnatural way of balancing, and it inevitably involves the generation of friction and conflicting forces, sometimes unpredictably so, between the wheels and the road.

In-line skates are popular because the skater can accelerate faster, and they tend to use larger diameter wheels, which reduces rolling resistance.

SUMMARY OF THE INVENTION

The present design is that of a steerable in-line skate, which combines the advantages of conventional skates with those of in-line skates. The in-line skate or any such similar apparatus such as a scooter or skateboard, can be steered into a new vector or direction by merely leaning the foot at some desired angle from the vertical, as with a conventional "quad" skate, versus having to both lean and rotate the foot about a vertical axis.

According to the present invention, there are provided two or more wheels situated on the longitudinal centerline of the skate. A wheel is situated on or near the skate's longitudinal centerline at the front of the skate. This wheel steers about an instantaneous axis, which is inclined forward relative to vertical. That is, the horizontal distance between the wheel vertical centerline and the steering axis at the top of the wheel is greater than that at the bottom of the wheel. The steering axis intersects the ground (assumed flat) ahead of the point at which the wheel touches the ground. Thus a caster is produced with an inclined axis.

The steering axis is produced using two pivoted links. The exact position of the steering axis may move slightly as the wheel is turned to the left or the right. Each link comprises two parallel pivots, one at each end. The two links are positioned approximately symmetrically either side of the skate longitudinal centerline. The links are orientated so that the pivots are parallel to the steering axis. The two leading pivots are closer together than the trailing pivots. The trailing pivots are connected via a bracket to the wheel axle or spindle. The leading pivots are connected to the skate frame.

The wheel is asymmetrical and dished in shape to allow the above assembly to be positioned near the skate centerline.

A further wheel(s) is/are positioned to the rear of the skate, also approximately on its longitudinal centerline.

It is possible to use large or small wheels with this design depending on the intended use. Skates with small wheels can be made more compact for greater maneuverability. Large wheel skates are better for use on rough surfaces, or where higher speed is required.

BRIEF DESCRIPTION OF THE DRAWINGS

A specific embodiment of the invention will now be described, by way of example, with reference to the accompanying drawings in which:

FIG. 1 shows a diagrammatic elevation of the skate with a section through the front wheel to show the steering axis.

FIG. 1A shows an enlarged partial diagrammatic view along line A of FIG. 1.

FIG. 2 shows an isometric view of an embodiment of the skate incorporating the steering mechanism.

FIG. 3 shows a variation of the steering mechanism according to the invention.

FIG. 3A shows a diagrammatic section view along section line 3A—3A of FIG. 3.

FIG. 4A shows the steering mechanism with the wheel turned to the left while FIG. 4B shows the steering mechanism with the wheel turned to the right;

FIG. 5 details the steering mechanism in conjunction with a scooter; and FIG. 5A shows an enlarged partial diagrammatic view along line A of FIG. 5;

FIG. 6 shows the steering mechanism in use with a skateboard and FIG. 6A shows an enlarged partial diagrammatic view along line A of FIG. 6.

DESCRIPTION OF THE PREFERRED EMBODIMENT

Referring to the drawings, the skate comprises a boot 1, a frame 2, front and rear wheels 3, 4, two pivoted levers 5, 6, and a bracket 7, as shown diagrammatically in FIG. 1.

The frame positions the boot relative to the wheels. Two pivoted levers connect the frame to the front wheel via a bracket. The levers are inclined to the vertical, and pivot in such way that the wheel steers about an instantaneous axis 8, which is inclined to the vertical, and positioned ahead of the wheel. A rake 9 and a caster 10 are created in this way which facilitates the turning effect. When the skate is leaned to the right with some downward force, the positioning of the steering axis is such that the front wheel is made to turn predictably to the right and vice versa.

The present description provides the skate suspension in conjunction with an in-line skate, the described skate suspension is also applicable to any style or design of skate. Skate devices include similar wheeled apparatus such as skateboards, mountainboards and scooters.

As set forth above, in the case of a traditional roller or in-line skate, the frame is attached positively to the foot of a user by way of a boot or a clamping mechanism secured to the foot and positioned on the skate frame whereby the frame is substantially fast with and secured to the boot. It is contemplated that the device also be used in conjunction with a skateboard, mountainboard or scooter, where there is no such boot secured to the frame. A board or platform upon which a user is freestandingly supported is affixed in conjunction with the frame and suspension. The user stands and balances on the board or platform with both feet freely movable to provide movement of the feet and weight displacement by the user relative to the board or platform in order to accomplish the steering action provided by the described suspension.

As shown in FIGS. 5 and 5A, a scooter is a skate apparatus substantially similar to an in-line skate or a skateboard, the difference being mainly a column 20 extending from a secure or substantially secure at or near the front portion of the frame 2 up to a handle 22 grasped by the user whereby the user of the scooter can apply a steering force or displacement to the leading portion of the scooter via the handle and column to promote the steering action provided for by the above described suspension.

FIGS. 6. and 6A shows the use of the above described suspension used with a skateboard device. The frame has merely a support surface 24 generally integral with the frame 2 upon which the user stands and guides the skate apparatus with a weight change and freely movable foot placement.

What is claimed is:

1. An apparatus comprising:
    a frame supporting spaced apart first and second rotatable wheels which are peripherally rollaby supported on a ground surface, the first whee being steerable about an instantaneous axis which is inclined forward relative to a vertical axis and intersects the ground surface ahead of a contact point of the first wheel with the ground surface;
    a first pivot lever and a second pivot lever, said first and second pivot levers having a leading pivot at a first end and a trailing pivot at a second opposing end, the two leading pivots are pivotally connected to the skate frame and the trailing pivots are pivotally connected to one of a wheel axle and a spindle via a bracket; and
    wherein a rotation of the steerable first wheel about the instantaneous axis is produced by a relative repositioning of the two pivot levers as dictated by the frame.

2. The apparatus as claimed in claim 1, wherein the first wheel is located along a longitudinal centerline of the frame.

3. The apparatus as claimed in claim 1, wherein the first wheel is positioned near a front portion of the frame.

4. The apparatus as claimed in claim 1, wherein the second wheel is positioned near a rear portion of the frame and located approximately along a longitudinal centerline of the frame.

5. The apparatus as claimed in claim 4, wherein the first wheel is asymmetrical and dished in shape to enable the two levers, connected via the bracket to one of the wheel axle and spindle, to be positioned adjacent a center of the first wheel and the second wheel is asymmetrical and dished in shape to enable the second wheel to be supported adjacent a center of the second wheel.

6. A skate apparatus as claimed in claim 1, further comprising a steering handle attached to a top surface of the frame for providing steerable actuation to the skate apparatus.

7. The apparatus as claimed in claim 6, wherein the first wheel is located along a longitudinal centerline of the frame.

8. The apparatus as claimed in claim 6, wherein the first wheel is positioned near a front portion of the frame.

9. The apparatus as claimed in claim 6, wherein a second wheel is positioned near a rear portion of the skate frame and located approximately along a longitudinal centerline of the frame.

10. The apparatus as claimed in claim 6, wherein the first wheel is asymmetrical and dished in shape to enabler the two levers, connected via the bracket to the wheel axle or spindle, to be positioned adjacent a center of the first wheel and the second wheel is asymmetrical and dished in shape to enable the second wheel to be supported adjacent a center of the second wheel.

11. A skate apparatus comprising:
    a skate frame having a boot for securing the foot of a user thereto, the frame supporting spaced apart first and second wheels, the first wheel being steerable about an instantaneous axis which is inclined forward relative to a vertical axis of the skate frame and the instantaneous axis intersects a ground surface against which the steerable wheel rolls along, during use, ahead of a point at which the wheel engages the ground surface so as to produce a caster with a forward inclined axis; and
    wherein an instantaneous position of the steering axis is produced by two pivoted levers, each of the two pivoted levers has a leading pivot at one end thereof and a trailing pivot at an opposite end thereof, the two leading pivots are pivotally connected to the skate frame and are located closer together than the two trailing pivots in a nominal forward direction of travel, and the trailing pivots are pivotally connected to one of a wheel axle and a spindle via a bracket.

12. The skate apparatus according to claim 11, wherein the axes of the leading pivots and axes of the trailing pivots are parallel to one another and substantially parallel to the steerable instantaneous axis.

13. The skate apparatus according to claim 11, wherein the two levers are positioned approximately symmetrically on opposite sides of a longitudinal centerline of the device.

14. The skate apparatus according to claim 11, wherein the first and second wheels are each located along a longitudinal centerline of the device.

15. The skate apparatus according to claim 11, wherein the steerable first wheel is positioned adjacent a front portion of the device.

16. The skate apparatus according to claim 11, wherein the second wheel is positioned adjacent a rear portion of the device and substantially coincident with a longitudinal centerline of the device.

17. The skate apparatus according to claim 11, wherein the first wheel is asymmetrical and dished in shape to enable the two levers, connected via the bracket to one of the wheel axle and spindle, to be positioned adjacent a center of the first wheel and the second wheel is asymmetrical and dished in shape to enable the second wheel to be supported adjacent a center of the second wheel.

* * * * *